United States Patent Office 3,338,152
Patented Aug. 29, 1967

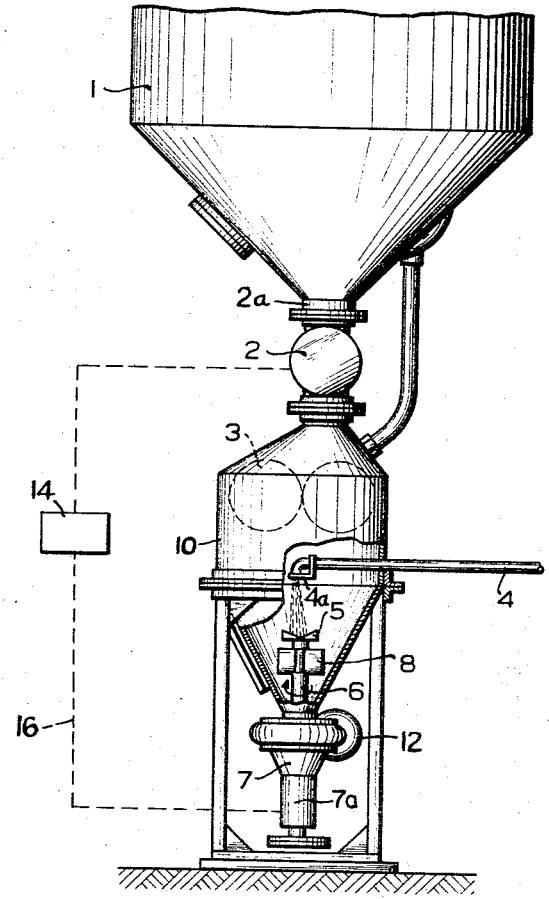

3,338,152
WET GRINDING ARRANGEMENT FOR
BREWING MALT
Conrad Lenz, Annenhofstr. 2, 805 Freising,
Upper Bavaria, Germany
Filed Nov. 16, 1964, Ser. No. 411,378
7 Claims. (Cl. 99—278)

This invention relates to brewery systems and, in particular, to a new and useful arrangement for the wet grinding of brewing malt.

Systems are known for wet grinding of brewing malt and may include a rotary distributor such as a spray plate onto which the dough water supplied to the mashed material is fed. If the mash pump fails while the feed rolls for crushing the malt continue to run, the mashed material arriving from the crushing rolls or bruising mill gradually clogs the hopper. If the feed rolls which take the malt from the malt tank are not stopped, breakage or failure of the apparatus may occur.

In accordance with the present invention, means are provided adjacent the exit of the mash hopper for sensing an accumulation of material and for stopping the feed from the malt tank. Vanes or plates are rotated adjacent the exit from the hopper, and an accumulation of material is sensed by the increased torsion acting on the rotating elements. Mechanical or electrical controls to actuate the feed rollers in accordance with the drag of the accumulating material on the plates.

Accordingly, it is an object of this invention to control the feed from the malt tank to a bruising mill in response to the accumulation of the mash in the hopper below the mill.

A further object of the invention is the provision of a brewery system which operates substantially automatically and without supervision.

A further object of the invention is a brewery system which is simple in design, rugged and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawing in which the sole, somewhat schematic figure shows a brewery system in accordance with the invention in an elevational view.

Referring to the drawing in detail, the brewery system illustrated includes a malt tank 1 in which the malt is soaked. The malt tank has sloping lower walls which are connected by a conduit 2a to feed rolls (not shown) located within a cylindrical housing 2. The feed rolls in the housing 2 deliver the malt material to a bruising mill where rotating rollers 3 crush the soft material. The crushed material falls into a hopper 10, and dough water is sprayed over the crushed material through a pipe 4 and a nozzle 4a. The crushed material and the dough water drops onto a distributor plate or spray plate 5. The plate 5 is secured to the shaft 6 of a rotary mash pump 7 which is driven by an electric motor 7a.

Vanes or wings 8 are secured to the shaft 6 and rotate therewith directly below the plate 5. The crushed material and the dough water tend to accumulate at the suction opening of the pump 7, which has a discharge conduit 12. The vanes 8 have a braking effect on the pump motor 7a when the soft material rises to their level in the hopper 10, due, for example, to a clogged line 12. The pump motor 7a is connected electically to a control device 14 for the non-illustrated drive of the feed rolls in the housing 2. A contact in the device 14 is actuated to shut the feed rolls off and to give an alarm when the electrical supply line 16 of the motor 7a draws an abnormal amount of power.

While a specific embodiment of the invention has been shown and described in detail it will be understood that this invention may be practiced otherwise without departing from the scope and spirit of the invention defined in the appended claims.

I claim:
1. In a brewing system for wet grinding brewing malt, including a tank for the malt, a mash hopper, feed means for delivering the malt from said tank to the mash hopper, means for supplying dough water over the malt material which is thus delivered, and electrically operated pump means for withdrawing the mash from the bottom of the hopper, the improvement comprising a rotatable wing connected with the pump means for rotation thereby and located in the hopper at a level to produce a braking effect on the pump means when the delivered material in said hopper increases to a predetermined amount, and control means connected to said electrically operated pump means and effective when said braking effect increases the power consumed by said pump means to a predetermined amount, to actuate said feed means to reduce the feed of material to said mash hopper.

2. A system for treating brewing malt comprising, in combination:
 (a) a hopper;
 (b) feeding means for feeding malt material to said hopper;
 (c) discharge means for discharging said material from said hopper;
 (d) vane means rotatable in said hopper;
 (e) drive means for rotating said vane means;
 (f) control means responsive to the resistance of said material to the rotation of said vane means in said hopper by said drive means for controlling said feeding means.

3. A system as set forth in claim 2, further comprising a bruising mill, said feeding means being arranged for feeding said material to said mill, and the mill being arranged to discharge the malt material crushed thereby to said hopper; said discharge means discharging said material from a bottom portion of said hopper, and said vane means being upwardly spaced from said bottom portion, said control means being responsive to the resistance of an accumulation of said material in said hopper extending from said bottom portion to said vane means.

4. A system for the wet grinding of brewing malt, comprising a malt container, a bruising mill arranged below said container, means for feeding said material from said container to said bruising mill, a mash hopper below said bruising mill in a position to receive the malt material crushed by said bruising mill, means for directing dough water onto the crushed malt in said hopper for mashing of the same, means for withdrawing the mashed material from the lower portion of said hopper, braking means in the lower portion of said hopper at a predetermined height above the bottom thereof, and control means connected to said feed means to control said feed means in response to the braking effect of the mashed material on said braking means when the level of the mashed material in said hopper rises to said braking means, said means for feeding material from said malt containter to said bruising mill comprising electrically actuated feed rolls, said means for removing mashed material from said mash hopper comprising an electrically operated pump, said braking means being connected to said pump for movement therewith, and said control means responding to an increase of power supplied to said pump caused by said braking means to stop said feed rolls.

5. A device according to claim 4, including alarm means for indicating when said feed rolls are stopped.

6. A device according to claim 4, wherein said braking means comprise a vane member, said pump having a shaft, said vane member being mounted on said shaft for rotation therewith.

7. A device according to claim 6, further comprising a distributor connected to said pump for rotation therewith in said hopper, said material crushed by said bruising mill and said dough water being directed over said distributor.

References Cited

UNITED STATES PATENTS

| | | | |
|---|---|---|---|
| 2,340,009 | 1/1944 | Meakin | 100—43 |
| 2,484,506 | 10/1949 | Hawk | 100—43 |
| 2,513,012 | 6/1950 | Dugas | 259—43 |
| 3,128,189 | 4/1964 | Watts et al. | 99—278 X |

WALTER A. SCHEEL, *Primary Examiner.*

ROBERT W. JENKINS, *Examiner.*